United States Patent [19]

Izumi et al.

[11] Patent Number: 5,080,876
[45] Date of Patent: Jan. 14, 1992

[54] SELF-REACTIVATING TYPE DENITRATING METHOD

[75] Inventors: Jun Izumi; Akinori Yasutake, both of Akunoura; Kazuaki Oshima; Seiichi Tanabe, both of Tokyo, all of Japan

[73] Assignee: Mitsubishi Jukogyo Kabushiki Kaisha, Tokyo, Japan

[21] Appl. No.: 511,320

[22] Filed: Apr. 20, 1990

[30] Foreign Application Priority Data

Apr. 21, 1989 [JP] Japan .................. 1-100303

[51] Int. Cl.⁵ .................. B01J 8/00; C01B 21/00
[52] U.S. Cl. .................. 423/239
[58] Field of Search .................. 423/239, 239 A

[56] References Cited

U.S. PATENT DOCUMENTS

| 3,674,429 | 7/1972 | Collins | 423/239 |
| 4,548,799 | 10/1989 | Knoblauch et al. | 423/239 |
| 4,964,889 | 10/1990 | Chao | 423/239 |

FOREIGN PATENT DOCUMENTS 1-310742  12/1989  Japan .................. 423/239

Primary Examiner—Gregory A. Heller
Attorney, Agent, or Firm—McAulay Fisher Nissen Goldberg & Kiel

[57] ABSTRACT

A self-reactivating denitrating method and equipment in which the exhaust gas from the combustor flows and goes through an adsorbing catalyst tower filled with Cu(II) exchangeable high silica zeolite at a temperature of normal to 750° C. to let NOx contained in the exhaust gas be adsorbed in the zeolite and decomposed into $N_2$ and $O_2$ resulting in achievement of cleaning the exhaust gas and then the zeolite saturated with NOx is put in touch countercurrently with air for combustion to let the adsorbed NOx be desorbed to reactivate Cu(II)exchangeable high silica zeolite and, at the same time, the air for combustion containing the adsorbed NOx is sent into the furnace of the combustor to decompose a part of NOx into $N_2$ and $O_2$ under an interfurnace combustion atmosphere.

3 Claims, 2 Drawing Sheets

SELF-REACTIVATING TYPE DENITRATING METHOD

FIELD OF THE INVENTION AND RELATED ART STATEMENT

The blowdown of NOx contained in exhaust gas from a combustor causing air pollution is under severe restrictions. For this reason, a variety of countermeasures such as improvements of combustion method or attachment of denitrating equipment have been taken widely.

Examples of the improvement of the combustion method include the methods of lowering the temperature in the furnace or of making the most of the reducibility of flame itself in view of the fact that NOx is produced by dissociation of $N_2$ and $O_2$ in high-temperature furnace or by reaction of N composition and $O_2$ in fuel.

Moreover, in the fixed source such as a boiler, etc., after ammonia equimolar with NOx in exhaust gas is added at a temperature of 300° to 400° C., the exhaust gas is put in touch with NOx reducing catalyst to convert NOx to $N_2$ and $H_2O$.

However, there is a limit to reduction of NOx by such a way of improving the combustion method. Furthermore, in the denitrating method using the ammonia reducing catalyst, there is a problem of increase in variable cost due to requirement of ammonia equimolar with NOx and there is another problem of environmental secondary pollution due to runoff of ammonia caused by excess addition thereof to NOx.

OBJECT AND SUMMARY OF THE INVENTION

The present invention provides a method and equipment for removing NOx in which the abovementioned disadvantages in conventional technologies have been overcome.

The inventors have confirmed experimentally that, when put in touch with Cu(II) exchangeable high silica zeolite at a temperature of normal to 750° C., most of NOx is adsorbed in the zeolite and especially if the temperature of the zeolite is between 350° and 600° C., a part of NOx is converted to $N_2$ and $O_2$ and another part of remaining NOx becomes $N_2O$ and is adsorbed in the zeolite together with the remaining NOx in the end.

The present invention has been achieved on the basis of the above knowledge to provide a self-reactivating type denitrating method featured by the processes in which the exhaust gas from the combustor flows and goes through an adsorbing catalyst tower filled with Cu(II) exchangeable high silica zeolite at a temperature of normal to 750° C. to let NOx be adsorbed in the zeolite and decomposed into $N_2$ and $O_2$ resulting in achievement of cleaning the exhaust gas and then the zeolite saturated with NOx is put in touch countercurrently with air for combustion to let the adsorbed NOx be desorbed to reactivate Cu(II) exchangeable high silica zeolite and, at the same time, the air for combustion containing the adsorbed NOx is sent into the furnace of the combustor to decompose a part of NOx into $N_2$ and $O_2$ under an interfurnace combustion atmosphere.

Moreover, to realize the abovementioned denitrating method, the present invention also provides an equipment characterized by the system in which an adsorbing catalyst tower filled with Cu(II) exchangeable high silica zeolite, one gas path to send exhaust gas from a combustor to the adsorbing catalyst tower and another path to discharge the exhaust gas from the catalyst tower are equipped and furthermore one path to supply air for combustion countercurrently to the adsorbing catalyst tower and another path to send the supplied air for combustion from the adsorbing catalyst tower to the abovementioned combustor are attached.

That is, the present invention provides a method for denitrating by introducing combustion exhaust gas containing NOx into the adsorbing catalyst tower filled with Cu(II) exchangeable high silica zeolite at a temperature of normal to 750° C. to let NOx be adsorbed in the zeolite. If the temperature of the Cu(II) exchangeable high silica zeolite is 350° C. or more, a part of NOx is, when put in touch with the zeolite, decomposed into $N_2$ and $O_2$ and, at the same time, a little amount of NOx is converted to $N_2O$; however, this $N_2O$ is also adsorbed in the zeolite together with the remaining NOx resulting in complete denitration in the end. If air for combustion is countercurrently supplied to the Cu(II) exchangeable high silica zeolite saturated by adsorbing NOx, because this air contains almost no NOx, partial pressure of NOx is generated between gas phase and the Cu(II) exchangeable high silica zeolite saturated by adsorbing NOx to let NOx be desorbed from the zeolite activating it again. The air for combustion containing NOx desorbed from the Cu(II) exchangeable high silica zeolite is supplied to the furnace of the combustor and, by reducing reaction of flame in the furnace, NOx is converted to $N_2$.

The ratio of silica and alumina ($SiO_2/Al_2O_3$) composing crystal of the high silica zeolite used in the present invention should be 5 or more, and Y type ($SiO_2/Al_2O_3=5$), Mordenite ($SiO_2/Al_2O_3=10$), ZSM-5 ($SiO_2/Al_2O_3=20\sim400$) developed by Mobil Inc., and Silicalite from Union Carbide reported to be equivalent to the ZSM-5 are included.

If Na in the high silica zeolite is exchanged for Cu(II), as shown in the report by Iwamoto et al., ("Catalyst" vol.31, no.2, 1989), NOx is decomposed into $N_2$ and $O_2$ at a temperature of 350° C. or more (optimum temperature being around 500° C.) and the higher the supporting rate of Cu(II) is (exchange ratio of Na being at least 30% or more), or the higher the ratio of $SiO_2/Al_2O_3$ is, the reaction is more active. Moreover, according to the experiments by the inventors, NOx is not decomposed at a temperature of less than 350° C. but peculiarly adsorbed and, in this case, the adsorbed amount is rather large in the Y type zeolite having less ratio of $SiO_2/Al_2O_3$.

Thus, in the present invention, a closed system for NOx is formed by a flow line containing the combustor→the exhaust gas flow path→the adsorbing catalyst tower→the air flow path for combustion→the combustor in turn and NOx is decomposed completely into $N_2$ and $O_2$ by reaction at two sites of the combustion and adsorbing catalyst tower.

Therefore, by applying the self-reactivating denitrating method by the present invention to combustion exhaust gas treatment, high efficient denitration can be achieved without using drugs such as ammonia.

DETAILED DESCRIPTION OF PREFERRED EMBODIMENTS

Figure 1:
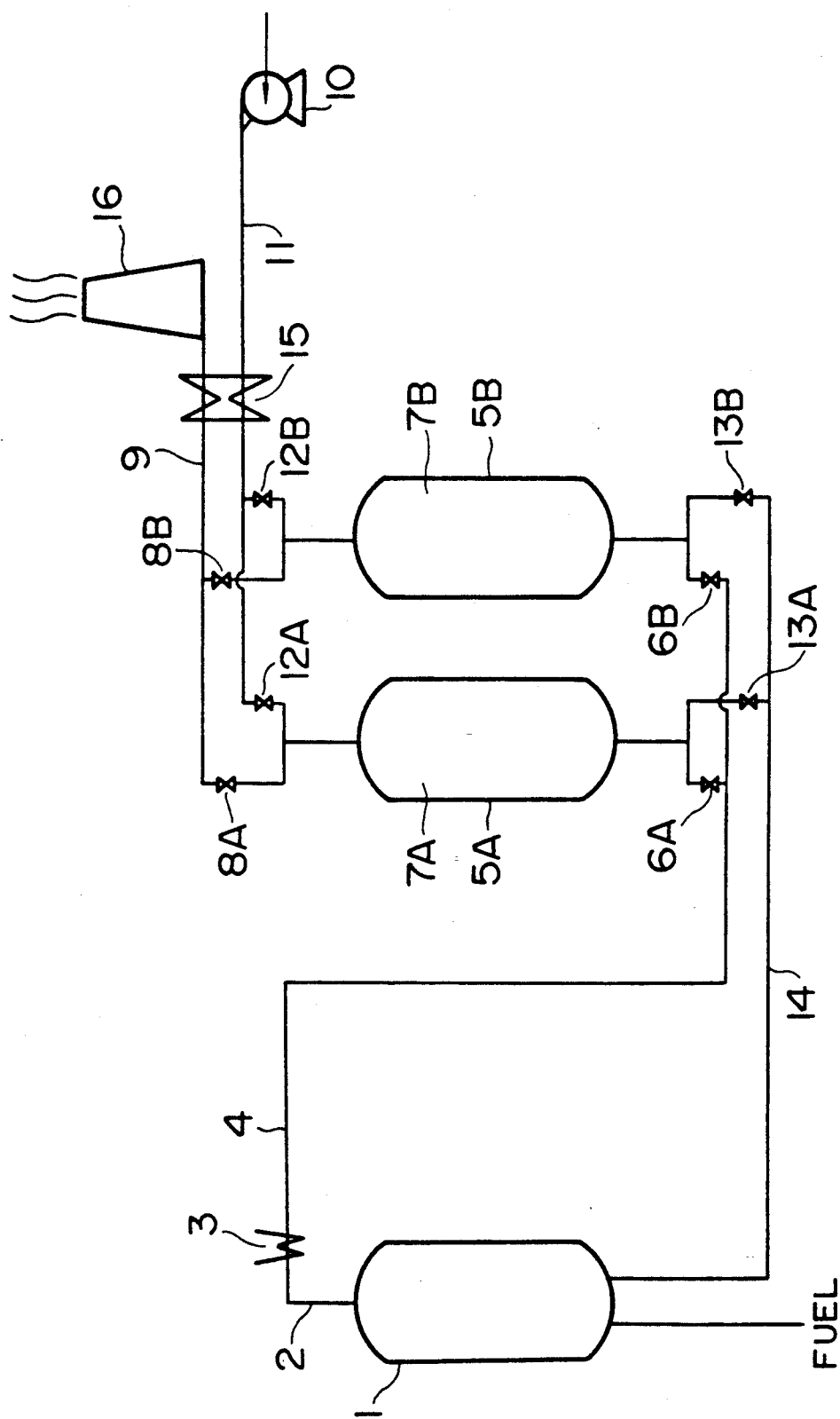
FIG. 1 is a schematic flow diagram illustrating the embodiment of the self-reactivating type denitrating method of the present invention.

The embodiment of the present invention is described on the basis of FIG. 1 as below.

The combustor 1 uses kerosene as fuel and the temperature of the furnace of the combustor 1 is 1300° C. and NOx concentration in the exhaust gas is 500 ppm.

The exhaust gas flown out of the flowpath 2, after its temperature is lowered by the heat exchanger 3 to 500° C., is sent to the NOx adsorbing catalyst towers 5A and 5B through the flowpath 4.

In the adsorbing catalyst tower 5A, NOx is adsorbed and a part of it is decomposed, while in the adsorbing catalyst tower 5B, the reactivating process is performed.

The exhaust gas containing NOx is sent through the valve 6 to the adsorbing catalyst tower 5A in which NOx in the exhaust gas is adsorbed in the Cu(II) exchangeable high silica zeolite 7A and a part of it is decomposed into $N_2$ and $O_2$, and then the cleaned exhaust gas is taken out through the valve 8A and the flowpath 9 from the chimney stack 16 at the top of the tower.

At the same time, in the adsorbing catalyst tower 5B, the air for combustion, the pressure of which is raised to about 1,000 mmAq by the combustion air fan 10, is flown through the flowpath 11 and the valve 12B countercurrently to the Cu(II) exchangeable high silica zeolite 7B to drive away the adsorbed NOx into the gas phase and to reactivate the zeolite.

The air for combustion containing NOx is introduced through the valve 13B and the flowpath 14 into the combustor 1 and NOx in the air is decomposed at the high temperature site in the furnace.

The cleaned exhaust gas and the air for combustion are heat-exchanged at the heat exchanger 15 and the heat-collected exhaust gas is discharged through the chimney stack 16 out of the system.

In order to verify the effects of the embodiment illustrated in FIG. 1, the self-reactivating type denitrating equipment of the present invention was attached to the kerosene combustion boiler which could produce exhaust gas of 3,000 Nm3/h. The NOx concentration in the exhaust gas was 500 ppm and $O_2$ concentration was 3 vol %.

Figure 2:
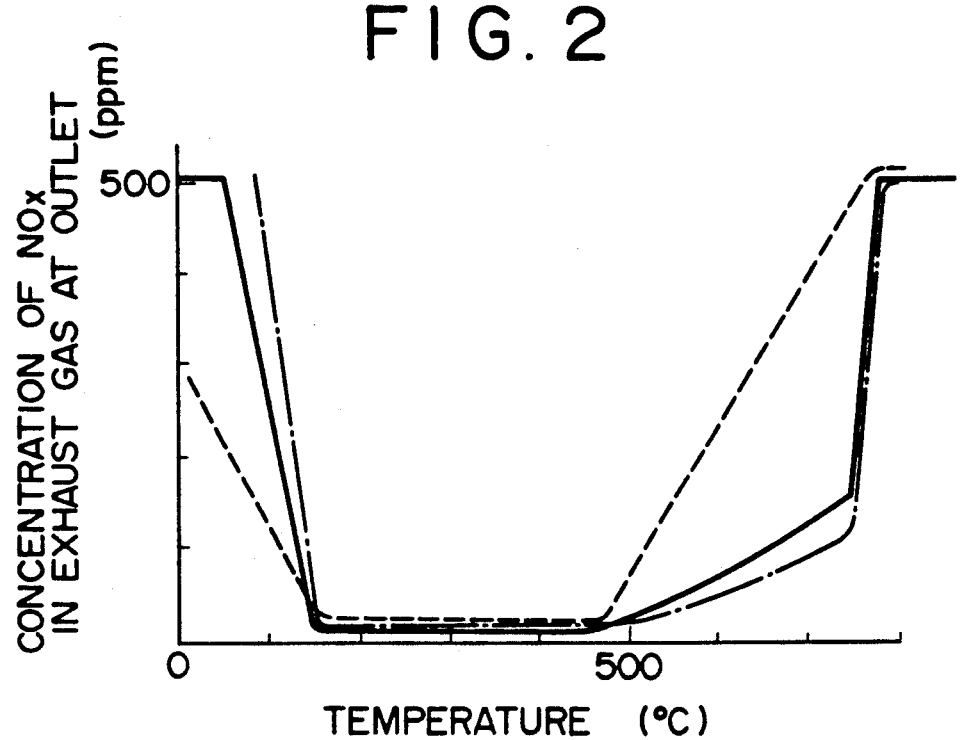
FIGS. 2 and 3 are diagrams to verify the effects of the present invention and the former is a diagram illustrating the relation between the temperature of the tower of the equipment and the concentration of NOx in the exhaust gas at the outlet and the latter is a diagram illustrating the relation between the amount of catalyst used and the concentration of NOx in the exhaust gas at the outlet.

FIG. 2 is a diagram illustrating the relation between the temperature of the tower of the equipment and the NOx concentration at the outlet in the case of use of 1 ton adsorbent (as a total for two towers). In the diagram, broken lines represent Y-type zeolite with 100% CU(II)exchange rate and of $SiO_2/Al_2O_3=5$; full lines representing mordenite with 100% Cu(II)exchange rate and of $SiO_2/Al_2O_3=10$; and dashed chain lines representing silicalite of $SiO_2/Al_2O_3=10$.

As shown in FIG. 2, if the temperature of the tower is low, the efficiency was high in the turn that Y-type>mordenite>silicalite and, on the other hand, if it is high, in the turn that silicalite>mordenite>Y-type. This is because, when the temperature is low, the performance depends on the adsorption of NOx and on the other hand, when it is high, on the decomposing reaction of NOx. If the temperature is more than 750° C., it is not usable because of deterioration caused by heat-decomposition of the zeolite itself.

Figure 3:
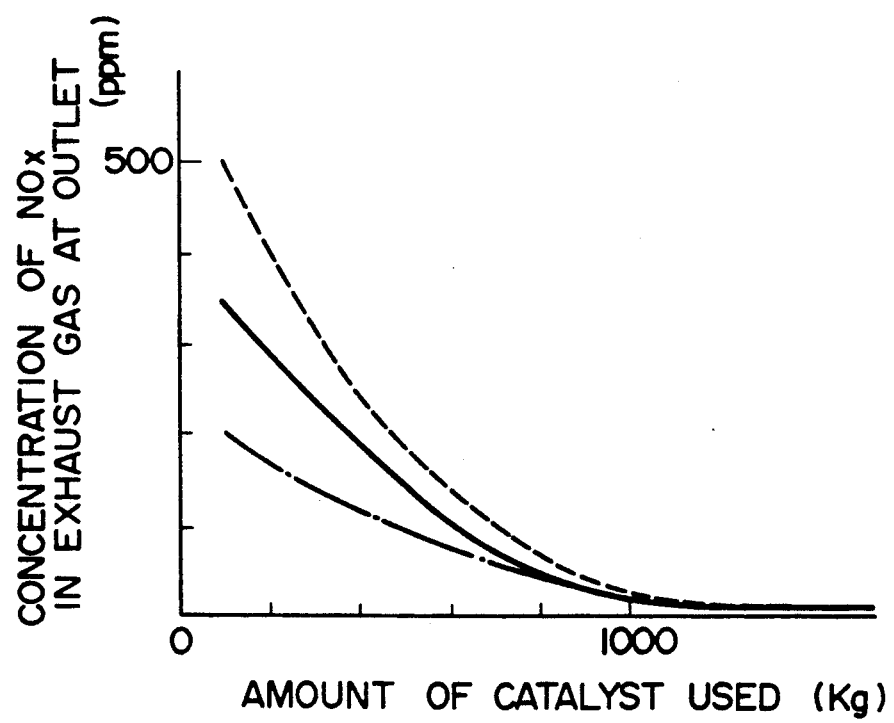

FIG. 3 is a diagram representing the relation between the NOx concentration at the outlet of the tower and the amount of adsorbent used with the temperature of the tower fixed at 500° C. As seen from FIG. 3, by using the adsorbent of 1 ton, the NOx concentration at the outlet can be easily reduced to less than 10 ppm.

We claim:

1. A self-reactivating type denitrating method comprising passing an exhaust gas from a combustor through an adsorbing catalyst tower filled with a Cu(II) exchangeable high silica zeolite at a temperature in the range from normal to 750° C. to adsorb the $NO_x$ in the adsorbing tower, decompose the $NO_x$ in $N_2$ and $O_2$ or adsorb and decompose the $NO_x$, to remove $NO_x$ from the exhaust gas, and then contacting the adsorbing catalyst which is saturated with $NO_x$ countercurrently with air to desorb the adsorbed $NO_x$ thereby producing $NO_x$ containing air and reactivate the Cu(II) exchangeable high silica zeolite, and convey the air containing the adsorbed $NO_x$ in the air into $N_2$ and $O_2$ under the atmosphere in the combustion furnace.

2. The self-reactivating denitrating method of claim 1 wherein the ratio of silica and alumina($SiO_2Al_2O_3$) composing crystal of the Cu(II) exchangeable high silica zeolite is 5 or more.

3. The self-reactivating denitrating method of claim 1 wherein the ratio of exchanging Cu(II) for Na is 30% or more in the Cu(II) exchangeable high silica zeolite.

* * * * *